United States Patent [19]

Brendel

[11] Patent Number: 5,141,238
[45] Date of Patent: Aug. 25, 1992

[54] SEALING ARRANGEMENT FOR A ROLL

[75] Inventor: Bernhard Brendel, Grefrath, Fed. Rep. of Germany

[73] Assignee: Eduard Küsters Maschinenfabrik GmbH & Co. KG, Krefeld, Fed. Rep. of Germany

[21] Appl. No.: 816,545

[22] Filed: Dec. 30, 1991

Related U.S. Application Data

[63] Continuation of Ser. No. 410,146, Sep. 20, 1989, abandoned.

[30] Foreign Application Priority Data

Sep. 23, 1989 [DE] Fed. Rep. of Germany ....... 3832405

[51] Int. Cl.$^5$ .............................................. F16J 9/00
[52] U.S. Cl. ........................................ 277/12; 277/70; 277/170; 277/DIG. 7
[58] Field of Search .................. 277/12, DIG. 7, 170, 277/70, 144, 142, 143; 100/162 B; 29/116.1, 116.2

[56] References Cited

U.S. PATENT DOCUMENTS

| | | | |
|---|---|---|---|
| 2,048,633 | 7/1936 | Eweis | 277/170 |
| 2,474,137 | 6/1949 | Vernet | 277/170 |
| 4,651,552 | 3/1987 | Ahrweiler. | |

FOREIGN PATENT DOCUMENTS

| | | |
|---|---|---|
| 1193739 | 1/1966 | Fed. Rep. of Germany. |
| 1026609 | 6/1970 | Fed. Rep. of Germany. |
| 3329595 | 10/1986 | Fed. Rep. of Germany. |

*Primary Examiner*—William A. Cuchlinski, Jr.
*Assistant Examiner*—D. DePumpo
*Attorney, Agent, or Firm*—Kenyon & Kenyon

[57] ABSTRACT

A sealing arrangement for a roll having a rotationally stationary crosshead extending through a rotatable hollow cylinder which forms an outer working circumference, includes longitudinal and transverse end seals disposed against the inner circumference of the hollow cylinder. The seals form at least one longitudinal chamber in the annular clearance space between the crosshead and hollow cylinder. The longitudinal chamber may be filled with pressure liquid for supporting the hollow cylinder. Each longitudinal seal in the form of a seal strip having a substantially L-shaped transverse cross-section with the shorter leg thereof directed against the inner circumferential surface of the hollow cylinder. The shorter leg includes a contact pressure relief surface facing the inner circumferential surface and spaced therefrom. The relief surface is in fluid communication with the pressure fluid in the longitudinal chamber and oriented so that pressure in the longitudinal chamber exerted on the pressure relief surface reduces the contact pressure between the longitudinal seal and the hollow cylinder.

3 Claims, 2 Drawing Sheets

SEALING ARRANGEMENT FOR A ROLL

This application is a continuation of application Ser. No. 07/410,146, filed Sep. 20, 1989 now abandoned.

TECHNICAL FIELD

This invention relates to rolls generally, and more particularly to an improved sealing arrangement for hydraulically supported rolls.

BACKGROUND OF THE INVENTION

Hydraulically supported rolls typically comprise a rotatable hollow cylinder forming a working roll circumference and a rotatably stationary crosshead extending lengthwise through the hollow cylinder to form an annular clearance space therebetween. The crosshead may have ends protruding therefrom to which external forces can be applied for supporting the roll, e.g., the ends may support the roll in a roll stand, calendar or similar support structure. Circumferentially spaced longitudinal seals are attached to the crosshead to abut the inner circumferential surface of the hollow cylinder. Axially spaced transverse end seals having a generally semiannular configuration are secured in respective circumferential slots in the two opposite ends of the crossheads such that they are secured in the circumferential slots against rotation and are displaceable in the action of the plane of the roll. The longitudinal and transverse end seals form at least one longitudinal chamber in the annular clearance space.

A sealing arrangement for hydraulically supported rolls is disclosed in DE-PS 11 93 739 wherein the longitudinal seal is in the form of a seal strip having an approximately L-shaped transverse cross-section. The longer leg of the "L" is supported in a longitudinal undercut or groove formed in the crosshead, while the shorter leg of the "L", which includes an end face that abuts the inner circumferential surface of the hollow cylinder, is oriented approximately perpendicular to a line tangent to the perimeter of the inner circumferential surface at a point of contact therewith.

Sealing arrangements incorporating such seal strips have been effectively used in floating rolls as disclosed in DE-PSA 10 26 609. Floating rolls have been developed to suitably perform in various applications. Such applications include those where the crosshead is subject to especially strong flexing forces due to high loading or a relatively small crosshead cross-section as disclosed in DE-PS 33 29 595. When subject to high loading or when the crosshead cross-section is relatively small, the crosshead may undergo excessive displacement at its center relative to the inner circumferential surface of the hollow cylinder. Such crosshead deflection leads to varying inclined positions of the L-shaped seal strip. L-shaped seals having a longer major leg have been used to limit this variation in the inclined position, which gives rise to edgewise contact of the shorter leg of the "L". The variation of the inclination of the seal strip is thus reduced during a certain radial displacement of the inner circumference of the hollow cylinder relative to the seal receiving longitudinal undercut in a direction perpendicular to the inner circumference.

The pressure of the pressure fluid in the longitudinal chamber biases the portion of the seal strips adjacent the inner circumferential surface of the hollow cylinder against the inner circumferential surface. The biasing force increases as the pressure in the longitudinal chamber increases. Therefore, although the sealing effect increases as the pressure in the longitudinal chamber increases, excessive contact pressure between the seal strip and the inner circumferential surface of the hollow cylinder may result, which may, for example, cause seal strip wear and premature seal failure. Furthermore, an increase in the cross-section of the L-shaped seal strips is accompanied by an increase in the pressure-effective contact surface of the seal strip and the hollow cylinder, and thus an increase in the contact pressure force acting thereon. Alternatively, the specific surface pressure in the contact area of the seal strip increases with an increase in contact pressure force. Accordingly, problems related to increased pressures in the longitudinal chamber may be exacerbated by increased seal strip cross-section.

SUMMARY OF THE INVENTION

The present invention is directed to the provision of a sealing arrangement for a roll that avoids the above-mentioned problems and disadvantages of the prior art to reliably seal the longitudinal pressure chamber of the roll. The invention accomplishes this goal by providing a sealing arrangement for a roll comprising a rotatable hollow cylinder having an outer working roll circumference and a rotationally stationary crosshead extending through the hollow cylinder to form an annular clearance space between the outer circumferential surface of the crosshead and the inner circumferential surface of the hollow cylinder. Axially spaced transverse seals are engaged in respective circumferential slots formed in the crosshead, while circumferentially spaced longitudinal seals in the form of seal strips extend along the length of the crosshead and are coupled thereto. Each seal strip has a first longitudinal edge face engaged in a respective longitudinal groove formed in the crosshead, and a second longitudinal edge face for abutting against the inner circumferential surface of the hollow cylinder when the longitudinal seals are obliquely oriented relative thereto. Each longitudinal seal has a longitudinal surface facing the inner circumferential surface, while being spaced therefrom. At least one longitudinal chamber is formed in the annular clearance space between the longitudinal seals and the transverse seals for supporting the hollow cylinder with pressure fluid contained therein. The longitudinal chamber is in fluid communication with each longitudinal surface so that the pressure within the longitudinal chamber exerted on each longitudinal surface generates a force which is directed perpendicularly away from the inner circumferential surface to reduce the contact pressure between each longitudinal seal and the inner circumferential surface.

The pressure acting on the longitudinal surface of the seal strip reduces the contact pressure between the seal strip and the inner circumferential surface of the hollow cylinder, thereby relieving the seal strip hydraulically. The degree of contact pressure reduction depends on the orientation of the longitudinal surface and its area. Thus, appropriate structural design of the seal strip can provide the requisite degree of relief for a specific application. For example, the orientation of the longitudinal surface may be determined to provide the requisite degree of relief for a seal strip having a preselected transverse cross-sectional dimension.

The longitudinal surface may be formed in a number of ways. For example, a recess in each longitudinal seal adjacent the contact surface between a respective seal and the inner circumferential surface may form the longitudinal surface. The recessed cross-sectional cutout will generally have rectangular limiting wall surfaces. One of those limiting surfaces is disposed parallel to the inner circumference of the hollow cylinder so that the force acting thereon, generated by the pressure of the pressure fluid in the longitudinal chamber, directly counteracts the press-on or biasing force which biases the seal against the hollow cylinder.

Alternatively, a bevel in each longitudinal seal immediately adjacent a line of contact between a respective seal and the inner circumferential surface may form each longitudinal surface. In this embodiment, only a component of the force acting on the beveled surface and normal thereto counteracts the press-on or biasing force which biases the seal.

The beveled seal configuration also forms a wiper edge at the end of each bevel that terminates at the respective second longitudinal edge face of each seal to wipe pressure fluid from the inner circumferential surface of the hollow cylinder during rotation thereof. Thus, while the hollow cylinder rotates, the wiper edge removes pressure fluid therefrom to minimize the amount of pressure fluid that may be entrained under the seal strip and prevent the fluid from reentering the longitudinal chamber.

DETAILED DESCRIPTION

Figure 1:
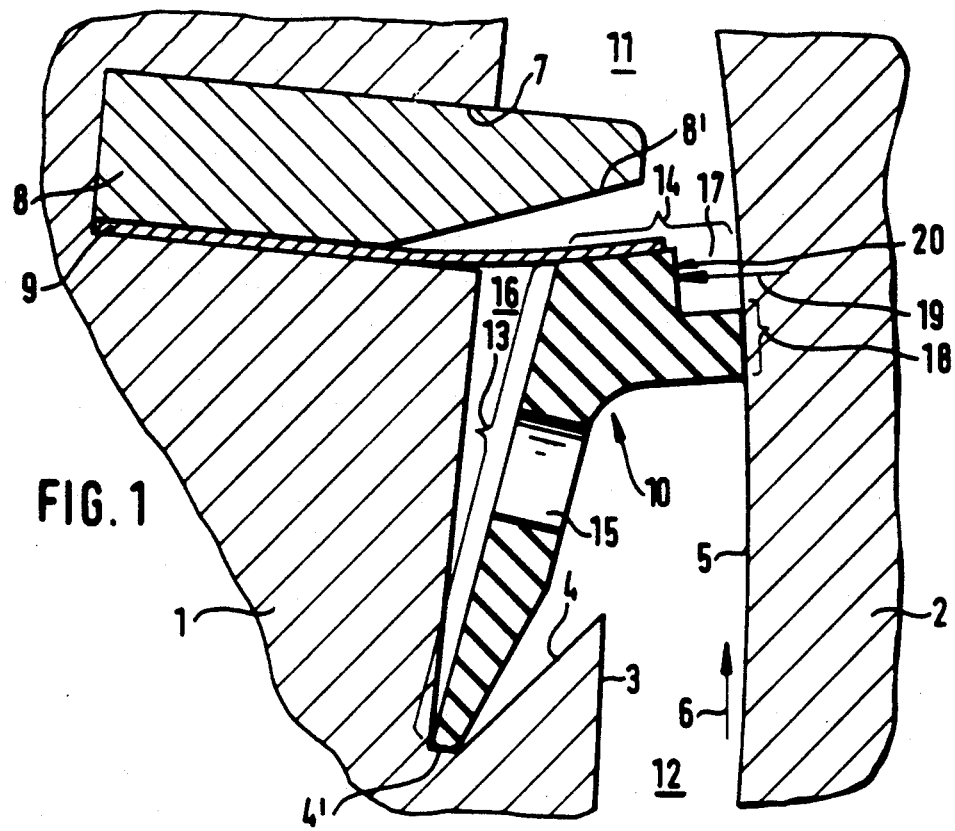
FIG. 1 is a partial cross-sectional view of a roll taken along a transverse section thereof to illustrate a longitudinal seal constructed according to the principles of the invention.
Figure 2:
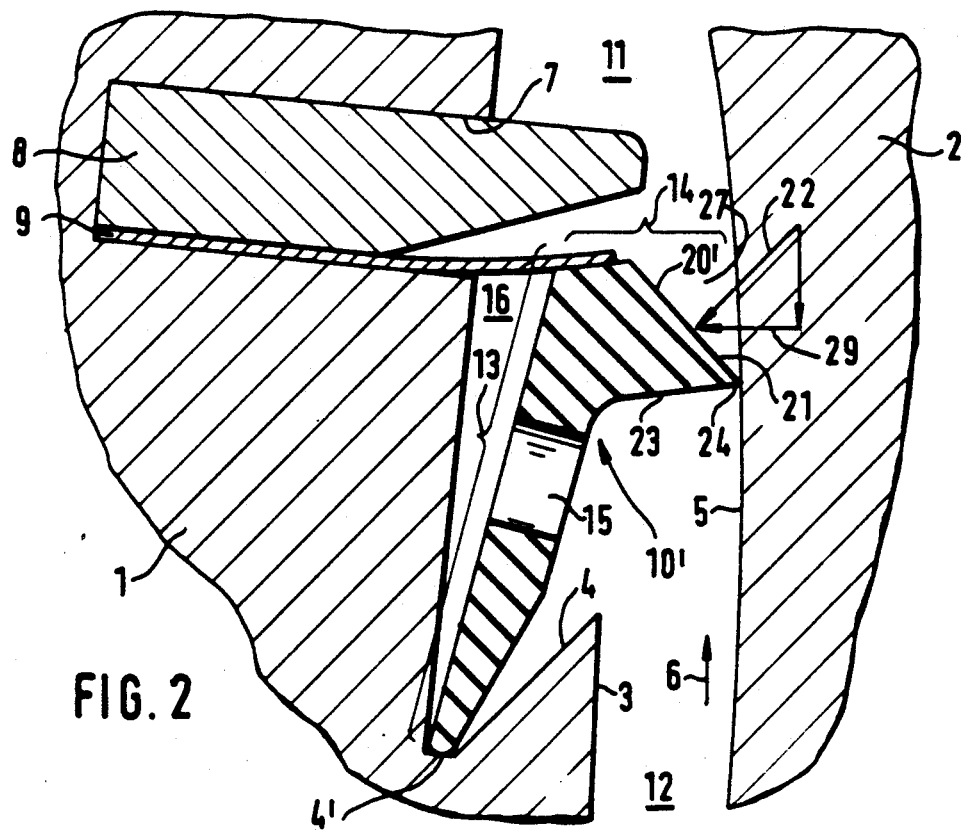
FIG. 2 is a partial cross-sectional view of a roll similar to that depicted in FIG. 1 illustrating a further embodiment of the longitudinal seal.
Figure 3:
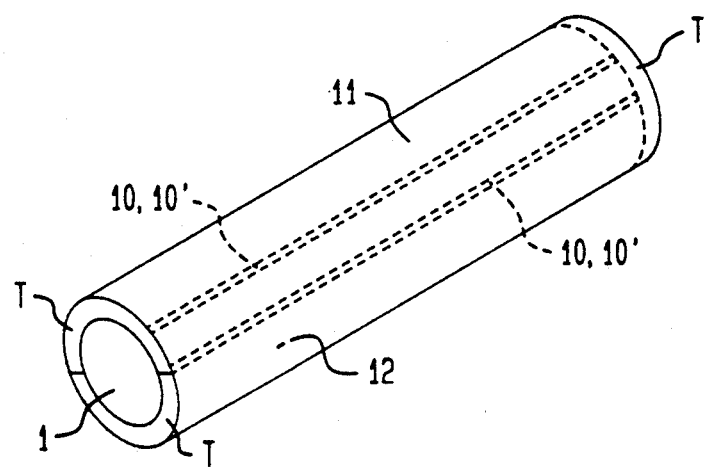
FIG. 3 is a perspective view of the invention.

Referring to the drawings in detail, wherein like numerals indicate like elements, FIGS. 1 and 2 show sealing arrangements for a roll which comprises hollow cylinder 2 rotatably mounted about rotationally stationary crosshead 1 so that cylinder 2 may, for example, rotate in the direction of arrow 6 While crosshead 1 remains in a fixed position.

Crosshead 1, which may be a substantially cylindrical beam, extends through hollow cylinder 2 to form an annular clearance space therebetween. The annular clearance space between crosshead 1, and inner circumferential surface 5 of hollow cylinder 2 is subdivided by longitudinal seals which are circumferentially spaced about crosshead 1 to abut the inner circumferential surface of hollow cylinder 2 and substantially seal closed longitudinal chamber 11. Transverse seals may be provided at the two opposite ends of the hollow cylinder to transversely seal substantially closed longitudinal chamber 11 as described above. Pressure liquid for supporting hollow cylinder 2 may be fed into longitudinal chamber 11 via a feedline (not shown) which, for example, may be formed in crosshead 1. The remaining portion of the annular space forms leakage chamber 12 which collects liquid that leaks from longitudinal pressure chamber 11. Fluid leaking past the longitudinal seals into leakage chamber 12 may be discharged through a line or conduit (not shown). Although merely a section of a roll and thus a portion of the annular clearance space which partially forms chamber 11 is shown in the drawings to clearly illustrate the construction of seal strip 10 (FIG. 1) or seal strip 10' (FIG. 2), it should be understood that another longitudinal seal is provided between crosshead 1 and cylinder 2 to seal chamber 11. Therefore, the sealing mechanism illustrated in either FIG. 1 or FIG. 2 and its respective unillustrated sealing mechanism are symmetrically positioned about a longitudinal center plane of the roll and preferably form mirror images of each other. The longitudinal seals also are preferably attached to diametrically opposite sides of crosshead 1. Accordingly, seal receiving longitudinal undercuts or grooves 4 are formed in and over the length of crosshead 1 at diametrically opposite sides thereof. Each undercut 4 includes base portion 4' configured to pivotally support one end of seal strip 10 or 10' and form a seal therewith. When the seal strip is pivotally mounted in undercut 4, its orientation may be easily adjusted so that it further sealingly abuts against cylindrical inner circumference 5 of hollow cylinder 2 to form a longitudinal seal for longitudinal chamber 11. Thus, the substantially V-shaped transverse cross-section of longitudinal undercut or groove 4 together with the configuration of its base portion 4', provides a mechanism for pivotally supporting and sealing one end, i.e., a first longitudinal edge face, of seal strip 10 or 10' in crosshead 1, while permitting another end, i.e., a second longitudinal edge face, of the strip to sealingly engage the inner circumferential surface of cylinder 2.

Seal strip 10 has a substantially L-shaped transverse cross-section with longer leg 13 extending into longitudinal undercut 4 so that its longitudinal edge, the first longitudinal edge face, sealingly engages base portion 4', and shorter leg 14 extending essentially perpendicular to inner circumferential surface 5 of hollow cylinder 2 so that its longitudinal edge, the second longitudinal edge face, sealingly abuts circumferential surface 5 in the region of surface 18. In each embodiment illustrated in FIGS. 1 and 2, another longitudinal groove, i.e., groove 7, is provided in crosshead 1 above longitudinal undercut or groove 4. Wedge 8 is pressed in groove 7 to clamp leaf spring 9 in longitudinal groove 7 in a manner such that leaf spring 9 protrudes from longitudinal groove 7 along the length thereof to apply pressure against the upper portion of seal strip 10 or 10' opposite base portion 4'.

While viewing the drawings, it can be seen that longer leg 13 of seal strip 10 or 10' stands generally upright While being obliquely oriented with respect to the surface of longitudinal undercut 4 that is furthest from inner circumferential surface 5. Thus, longer leg 13 is inclined toward inner circumferential surface 5 so that the spring force of leaf spring 9 acting against its corresponding longitudinal seal strip, e.g., in the region of shorter leg 14, generates a force including a component directed toward inner circumferential surface 5 to bias shorter leg 14 of seal strip 10 or 10' against inner circumferential surface 5 of hollow cylinder 2. Seal strips 10 and 10' are further subject to other pressures as discussed below.

A portion of wedge 8 facing the protruding portion of leaf spring 9 is beveled at 8' so that the pressure fluid contained in longitudinal chamber 11 is in fluid communication with the top side of leaf spring 9 adjacent shorter leg 14. Therefore, when the pressure in longitudinal chamber 11 increases, the fluid therein may further bias shorter leg 14 against inner circumferential surface 5 of hollow cylinder 2.

Leakage chamber 12 may contain pressure fluid which has leaked through the longitudinal seals. Although the pressure developed in chamber 12 is less than the pressure in longitudinal chamber 11 and even may be negligible, seal strips 10 and 10' are constructed to ensure that the pressure in leakage chamber 12 does not tend to urge seal strip 10 or 10' away from inner circumferential surface 5 or adversely affect the seal therebetween. Specifically, bores 15 are provided in seal strips 10 and 10' along the length thereof so that the pressures in leakage chamber 12 and in chamber 16 formed behind seal strip 10 balance each other out hydraulically.

Referring to FIG. 1, the upper right portion of shorter leg 14 adjacent inner circumferential surface 5 of hollow cylinder 2, i.e., the portion facing longitudinal chamber 11 and inner circumferential surface 5, includes cutout 17 having an approximately rectangular cross section. In the embodiment shown, cutout 17 forms side surface 20 having a width approximately one half the width of leg 14, i.e., the width of leg 14 facing hollow cylinder 2 is approximately one half the width of the portion of leg 14 that is closer to crosshead 1, so that seal strip 10 only contacts inner circumferential surface 5 in region 18. Surface 20 is approximately parallel to inner circumferential surface 5 of hollow cylinder 2 and spaced therefrom, so that the pressure fluid in longitudinal chamber 11 is in fluid communication therewith. Therefore, the pressure in chamber 11 can exert a counterforce, i.e., force 19, which opposes the force exerted on seal strip 10 that biases the same toward circumferential surface 5. It may be said that force 19 is directed substantially radially inwardly along a local radius of the hollow cylinder. Thus, the contact pressure between the longitudinal seal and hollow cylinder 2 due to force generated by the pressure in longitudinal chamber 11 and spring 9, which together bias seal strip 10 toward circumferential surface 5 can be reduced by force 19. In this sense, surface 20 forms a pressure relief surface. The degree of such pressure relief is directly proportional to the area of surface 20 due to the orientation of surface 20, i.e., being approximately parallel to inner circumferential surface 5 of the hollow cylinder.

Referring to FIG. 2, it can be seen that the shorter leg configurations provide the only difference between seal strip 10 and seal strip 10'. More specifically, the upper right portion of shorter leg 14 facing longitudinal chamber 11 and inner circumferential surface 5 of hollow cylinder 2 includes surface 20' formed by bevel 21. Bevel 21 also forms space 27 which provides fluid communication between surface 20' and longitudinal chamber 11. However, force generated by the pressure in chamber 11 which acts on surface 20' at an angle normal thereto, such as the force designated by arrow 22, acts at an incline relative to inner circumferential surface 5 of the hollow cylinder 2. Therefore, it is the component of force 22, designated by arrow 29, that acts substantially normal to inner circumferential surface 5 of hollow cylinder 2, like force 19, to urge seal strip 10' away from surface 5 and to reduce the contact pressure between seal strip 10' and surface 5 or lift strip 10' therefrom. Accordingly, the inclination and surface area of surface 20' influences the magnitude of force 29 which reduces the contact pressure between seal strip 9 and surface 5.

Seal strip 10' also includes wiper edge 24 formed at the juncture of surface 20' and surface 23 of seal strip leg 14. Surface 23 faces leakage chamber 12 and is substantially perpendicular to inner circumferential surface 5 of the hollow cylinder 2. During rotation of hollow cylinder 2 in the direction of arrow 6, wiper edge 24, as shown in FIG. 2, contacts and wipes off inner circumferential surface 5 adjacent thereto. Thus, wiper edge 24 minimizes the amount of pressure fluid that may be entrained under seal strip 10' and prevents the fluid from reentering longitudinal chamber 11.

What is claimed is:

1. A sealing arrangement for a roll comprising:
   a) a rotatable hollow cylinder having an outer working roll circumference;
   b) a rotationally stationary crosshead extending through the hollow cylinder to form an annular clearance space between the outer circumferential surface of the crosshead and the inner circumferential surface of the hollow cylinder, said crosshead including circumferentially spaced longitudinal slots and circumferentially spaced longitudinal grooves formed therein;
   c) axially spaced transverse ends seals disposed against the inner circumference of the hollow cylinder;
   d) circumferentially spaced longitudinal seals in the form of seal strips extending along the length of the crosshead and coupled thereto, each seal strip having a longitudinal edge face engaged in a respective longitudinal groove formed in the crosshead and a longitudinal edge abutting against the inner circumferential surface of the hollow cylinder when said longitudinal seals are obliquely oriented relative thereto, each longitudinal seal being beveled to form said longitudinal edge and a longitudinal surface that extends from said longitudinal edge and faces said inner circumferential surface while being spaced therefrom, said longitudinal edge forming a line of contact with said inner circumferential surface thereby forming a wiper to wipe pressure fluid from the inner circumferential surface during rotation thereof;
   e) circumferentially spaced longitudinal leaf springs extending along the length of the crosshead and engaged in the respective longitudinal slot formed in the crosshead, and a longitudinal wedge located along with said leaf spring in an abutting relationship therewith within said longitudinal slot, whereby the wedge assists in the retention of the leaf spring in the slot, and the leaf spring provides a component of force that helps place the longitudinal seal with which it is associated in contact with the inner circumferential surface of the hollow cylinder; and
   f) at least one longitudinal chamber formed in the annular clearance space between the longitudinal seals and the transverse seals for supporting the hollow cylinder with pressure fluid contained therein, said longitudinal chamber being in fluid communication with each longitudinal surface, whereby pressure within the longitudinal chamber exerted on each longitudinal surface generates a force which is directed perpendicularly away from said inner circumferential surface to reduce the contact pressure between each longitudinal seal and the inner circumferential surface.

2. The device of claim 1, wherein the leaf spring is not planar.

3. The device of claim 1, wherein the wedge protrudes outwardly from the slot in the crosshead in which it is placed.

* * * * *

UNITED STATES PATENT AND TRADEMARK OFFICE
CERTIFICATE OF CORRECTION

PATENT NO.   : 5,141,238
DATED        : 25 August 1992
INVENTOR(S)  : Bernhard Brendel It is certified that error appears in the above-identified patent and that said Letters Patent is hereby corrected as shown below:

| Column | Line | |
|--------|------|---|
| 3 | 44 | Change "While" to --while--. |
| 3 | 54 | Change "seals" to --seals T--. |
| 4 | 49 | Change "While to --while--. |
| 6 | 20 | Change "ends" to --end--. |

Signed and Sealed this

Twenty-first Day of September, 1993

Attest:

BRUCE LEHMAN

Attesting Officer

Commissioner of Patents and Trademarks